US005257177A

United States Patent [19]

Bach et al.

[11] Patent Number: 5,257,177

[45] Date of Patent: Oct. 26, 1993

[54] APPARATUS FOR CONTROLLING THE MOVEMENT OF HYDRAULICALLY MOVABLE WORK EQUIPMENT AND A PATH CONTROL ARRANGEMENT

[75] Inventors: Michael Bach; Kjeld Aagaard; Torben Juul, all of Nordborg, Denmark; Hans E. Fogh, Nacka, Sweden; Svend E. Thomsen, Nordborg, Denmark; Helge S. Plougsgaard, Sydals, Denmark; John Kristensen, Sønderborg, Denmark; Bent Larsen, Augustenborg, Denmark

[73] Assignee: Danfoss A/S, Nordborg, Denmark

[21] Appl. No.: 763,891

[22] Filed: Sep. 23, 1991

[30] Foreign Application Priority Data

Sep. 29, 1990 [DE] Fed. Rep. of Germany ....... 4030954

[51] Int. Cl.[5] ......................... G06F 15/20; E02F 3/32

[52] U.S. Cl. .......................... 364/167.01; 364/424.07; 414/699; 340/685; 37/414

[58] Field of Search .................. 364/167.01, 142, 180, 364/424.07; 414/698, 699, 700, 718, 728, 750, 711; 340/685; 37/DIG. 1, DIG. 7

[56] References Cited

U.S. PATENT DOCUMENTS

| | | | |
|---|---|---|---|
| 4,514,796 | 4/1985 | Saulters et al. | 364/142 |
| 4,722,044 | 1/1988 | Heiser et al. | 364/180 X |
| 5,088,020 | 2/1992 | Nishida et al. | 364/167.01 X |
| 5,160,239 | 11/1992 | Allen et al. | 364/167.01 X |

*Primary Examiner*—Joseph Ruggiero
*Attorney, Agent, or Firm*—Wayne B. Easton

[57] ABSTRACT

Apparatus for controlling the movement of hydraulically movable work equipment that is arranged at the end of a length-adjustable and pivotable arm, along a substantially rectilinear path of movement, the work equipment being moved with the assistance of hydraulic drive units that act on the arm in dependence on input control signals that determine the path of movement. Even in the case of non-ideal control loops for the control of the drive units, it is intended that the work equipment be moved along a desired path. For that purpose, starting from an actual position of the work equipment, a sequence of desired positions in the path of movement is ascertained and the work equipment is moved from an actual position to the next desired position, the movement into the next position not being initiated until the work equipment is located in a predetermined tolerance band about the preceding position.

17 Claims, 3 Drawing Sheets

APPARATUS FOR CONTROLLING THE MOVEMENT OF HYDRAULICALLY MOVABLE WORK EQUIPMENT AND A PATH CONTROL ARRANGEMENT

The invention relates to a method for controlling the movement of hydraulically movable work equipment that is arranged at the end of a length-adjustable and pivotable arm along a substantially linear movement path, the work equipment being moved with the assistance of hydraulic drive units, namely a drive for length and a drive for angle, which act upon the arm in dependence on input control signals that determine the path of movement, and to a path control arrangement for hydraulically movable work equipment that is arranged at the end of a length-adjustable arm pivotable about an axis fixed with respect to the carrier, the arrangement having hydraulic drive units, namely a drive for length, for changing the length of the arm, and a drive for angle, for rotating the arm, a control device, which comprises a data memory and a processing device, an operating arrangement that is connected to the control device and in dependence on its position generates input control signals, and position sensors which ascertain the length of the arm and its angle in relation to a predetermined plane.

As described in the January 1990 edition of "Hydraulics & Pneumatics", page 34 and the October 1988 edition, page 78–81, work equipment on all-terrain vehicles is becoming increasingly important. The work equipment may be, for example, the fork of a fork-lift truck, the shovel of an excavator, the hook of a mobile crane, or a working platform. The movements of the work equipment can best be described, on the basis that it is suspended at the end of a length-adjustable and pivotable arm, in a system of polar coordinates that is arranged in the rotation plane of the arm. The middle point of the polar coordinate system coincides with the axis of rotation of the arm. The drive units are able to effect problem-free movements of the work equipment in a radial or azimuthal direction. In both cases, only the drive unit responsible for the corresponding direction requires to be operated. Movements of the work equipment exclusively in the radial or azimuthal direction in the polar coordinate system are, however, in many applications useless. Frequently a rectilinear movement is required, for example when the fork of a fork-lift is to be driven under a pallet in order to lift the latter, or when the pallet is to be lifted in a vertical direction. For such a movement, the drive units for the change in length and the change in angle have to be co-ordinated with one another. Such a co-ordination requires the operator to have a skill that can only be achieved after long practice or not even then.

For that reason, U.S. patent Ser. No. 4,722,044 has described a method and a path control arrangement of the kind mentioned in the introduction in which a microcomputer is provided to convert the input control signals into operating signals for the individual drive arrangements. Here, for example, the drive unit for length is operated. The change in length is measured. The microcomputer calculates the operation of the drive unit for angle that is required as the result of the length change in order to achieve a desired linear or rectilinear path. The control is arranged so that the end of the arm, that is, the work equipment, is moved in a gradual approximation to a straight line. The straight line need not necessarily run in a horizontal or vertical direction. The magnitude of the steps can be made as small as the resolution of the sensors for detecting the change in length and angle allows.

Such a control system presupposes ideal relationships between the control loops for the change in length and angle, which are generally not present. In practice, it has been found that there are a number of reasons why the work equipment cannot be guided along the desired path despite the known control system. For example, there may not be sufficient hydraulic fluid available, the external load may be too great, the operating space may be limited, there may be a certain inertia in the movement of the whole machine or the presupposed ideal valve characteristics cannot be realised. Because of these faults, there may be relatively large deviations from the rectilinear path, without the operator receiving immediate warning thereof. For example, when loading a lorry with a pallet, the work equipment, that is to say the fork, may not be moved horizontally, as is desired, but with a slight inclination downwards, although a horizontal movement has been set by the operating equipment. Since there is a tendency to lift the pallet only to the minimum height above the working surface, because of the inclination of its path of movement the pallet will hit the lorry. The operator is able to compensate for this inclination of the path of movement downwards by setting a vertical movement upwards simultaneously with the horizontal movement. This is not the point, however, since such a mode of operation again requires the operator to have an accurate knowledge of the machine and a considerable degree of skill.

The invention is based on the problem of providing a method for controlling the movement of hydraulically movable work equipment, and a path control arrangement, which guarantee that the desired path of movement of the work equipment will be maintained.

In a method of the kind mentioned in the introduction, that is achieved in that, starting from an actual position of the work equipment, a sequence of desired positions in the path of movement is ascertained and the work equipment is moved from an actual position in a uniform, continuous movement to the next desired position, the movement into the next position not being initiated until the work equipment is located in a predetermined tolerance band about the preceding desired position.

One movement followed by another movement is therefore no longer the case. On the contrary, small sub-sections are calculated. The drive units can be operated simultaneously in order to move the work equipment over the sub-section. At the end of each sub-section, there is a check to establish whether the drive units have worked properly or not. If the work equipment is not in the desired position at the end of the sub-section, the next sub-section is not commenced. A small error, that is to say, relatively minor deviations from the individual desired position, are allowed. The desired position is considered to have been reached when the work equipment is positioned in the relatively narrow tolerance band about the desired position, even if the work equipment has not coincided exactly with the desired position. The tolerance band also serves as a safety measure, in order to allow a smooth succession of movements. Thus, for example, deviations that may arise because of different operating speeds and accuracies in the control of the drive units are smoothed out. Because the path of movement is divided into individual movement sequences, any deviation of the actual path of movement of the work equipment from the desired path of movement of the work equipment can be kept extremely small. The individual sub-sections need not be calculated altogether in advance. It is sufficient for the following sub-section, and thus the next desired position, to be calculated while the work equipment is covering the preceding sub-section. In this manner it is possible to react relatively quickly to changes in the input control signals.

Preferably, the desired positions have between them a distance that the work equipment is able to cover in fractions of a second. The individual desired positions therefore lie very close together. Jerky operation is thereby avoided. Moreover, the correction of any errors occurring in the path of movement is effected at very short intervals, so that the work equipment is able to follow the desired path of movement with great accuracy.

It is preferable herein for two desired positions to have an interval between them of the order of magnitude of 10 milliseconds. The path of movement is therefore, for instance, corrected about one hundred times per second.

In a preferred form of construction, the orientation of the work equipment in relation to the arm is changed with the assistance of a further hydraulic drive unit, namely a work equipment drive, in dependence on the movement of the arm. This is useful, for example, when the work equipment has to be kept at a specific angle to a specific plane, for example the plane of the carrier or a horizontal plane, so that a load located on the work equipment does not start to slip. This requirement is made in particular of fork-lift trucks, which are used to transport loaded pallets.

It is then preferable for the orientation of the work equipment in relation to the arm to be changed in dependence on the orientation of the arm to the direction of the force of gravity. The orientation of the arm to the direction of the force of gravity can be changed by two factors, namely by a movement of the arm in relation to the carrier, that is, for example, the vehicle to which the arm is secured, or by a movement of the carrier, for example when the vehicle drives up or down a slope. For example, when the fork of a fork lift truck is the work equipment being used, the fork can be kept horizontal in all possible positions of the arm so that a pallet is unable to slide off or lose its load.

Preferably, for each desired position a desired orientation is ascertained and movement into the next position is initiated only when the actual orientation deviates by less than a predetermined amount from the desired orientation. It is therefore not only the drive unit for length and the drive unit for angle that are included in the monitoring but also the drive unit for the work equipment.

In a further preferred form of construction, the total volumetric flow required by the hydraulic drive units is ascertained, the available volumetric flow is ascertained, the quotient of the available and the required volumetric flow is ascertained and, should the quotient be less than unity, each drive unit is supplied only with a volumetric flow reduced in accordance with the quotient. When the operator wishes to effect a movement of the work equipment using the operating equipment, in which movement the sum of the volumetric flows required for the individual drive units is greater than the amount that a pump is able to supply, the drive unit having the greatest demand will not be able to fulfil its function satisfactorily and its action will be delayed compared with the other drive units. It is highly probable that this will lead to a deviation of the actual path of movement of the work equipment from the desired path of movement. In the advantageous construction, provision is made for the division of the available volumetric flow to be effected according to a code, which is predetermined by the individual drive units. If, for example, a drive unit requires the amount A, the second drive unit requires the amount B and the third drive unit requires the amount C, the sum of A, B and C giving the sum D, but the pump makes available only the amount E, the first drive unit receives only the amount A x E/D, the second drive unit receives the amount B x E/D and the third drive unit receives the amount C x E/D. The movement of the work equipment may then in this case proceed as a whole somewhat more slowly, but the relation of the individual movements to one another remains the same, so that the work equipment is able to follow the desired path with great accuracy.

In a further preferred form of construction, the movement of each drive unit is controlled, each control loop having an amplification factor which is dependent on the relative error of all control loops. In principle, it is sufficient for the movements of the individual drive units to be co-ordinated by the central control system, which communicates an input value to each controller as a reference parameter. The controller will then adjust the drive unit to the required desired value. This presupposes, of course, that the individual controllers are operating in an essentially ideal manner. In practice, however, it can happen that the control within the individual drive units differ from one another, for example because of differing inertias, leakages, or for similar reasons. In that case, it is an advantage for the individual control loops to influence one another. The deviations caused by small errors in the individual control loops can therefore be balanced out before the control is forced to intervene by blocking the next desired values.

It is preferable here for the amplification factor to be calculated according to the formula:

$$KRi = 1 + 3 \times \frac{ei}{1 + ej + ek},$$

where KR is the amplification factor, e is the relative error of the individual control loops and i, j, k, are the indices of the individual control loops. The relative error e is here the expression for the deviation of the actual value from the desired value in relation to the desired value. Under ideal conditions, that is, when there are no control deviations, the amplification factor is unity. Depending on the extent to which one individual control loop lags behind another, that is to say, in dependence on the relative error of the individual control loop, the amplification factor increases. At the start of a movement, all relative errors are unity. The amplification factor thus has a value of two. When all control loops have been adjusted, that is, there is no longer any control difference, the amplification factor is unity. When loops j and k are adjusted before loop i is adjusted, the value KRi=4 is obtained for the amplification factor of the controller i. The controller i will therefore correct its control difference at a faster rate.

In a further preferred form of construction, at the end of the path of movement of the work equipment the speed of movement is gradually reduced. This avoids vibrations on the machine and unnecessarily harsh stresses. This can be achieved, for example, by a control of the valve characteristics in accordance with a ramp function.

Preferably, a sequence of movement paths is stored and repeated as required. This is especially desirable in the case of trivial and monotonous operating functions. The first time, the operator carries out the operating function by himself. On subsequent function routines the memory takes over the control. The operator still has the opportunity to carry out minor corrections.

It is also preferred for a change in weight of the work equipment to be ascertained. This allows statistics for the strain on the work equipment to be generated, which can be used, for example for calculation purposes.

It is then preferred that the moment exerted by the work equipment on the carrier be continuously ascertained. Because the initial weight of the work equipment is known, the current of the work equipment can be ascertained from the change in weight at any point in time. The moment that is being exerted by the work equipment on the carrier can then be established from the weight, the length of the arm, the deflection of the arm and the direction of the force of gravity. This moment provides information, for example, about the risk of the carrier tilting forwards, backwards or to the side. When a threshold value is exceeded, an alarm can be triggered and/or further movements increasing the moment can be blocked.

The problem is also solved by a path control arrangement of the kind mentioned in the introduction, in which the control device, starting from an actual position, ascertains a sequence of desired positions and delivers a drive signal to the hydraulic drive units in order to move the work equipment from its current position into the next desired position, the control device releasing the next desired position only when the position sensors report that the work equipment is located within a predetermined spacing about the current desired position.

The control device therefore continuously monitors whether the signals it has sent have had the desired result. As long as the desired result, that is to say, the desired position, has not been reached, a further movement of the work equipment beyond the desired value is not allowed.

Essentially ten milliseconds after making one desired value available, it is preferable for the control device to make the next desired value available. The calculation of the succession of the movement sequences is thus effected relatively quickly compared with the movement of the work equipment. Making the new desired value available after about ten milliseconds does not mean that the desired value also has to be released after this time. On the contrary, the release of the desired value depends on whether the work equipment has reached the previous desired position, that is to say, is located in a predetermined error spacing about the desired position.

Preferably, between the work equipment and the arm there is provided a further hydraulic drive unit, namely a work equipment drive, and a further position sensor, namely a sensor for angle for determining the angle between the work equipment and the arm, which drive units are connected to the control device. Not only is the position of the work equipment therefore continuously controlled and monitored, but also the orientation of the work equipment. As stated above, this can be an advantage in particular when loads that must not be allowed to slip are to be transported with the work equipment. In this case, a specific orientation of the work equipment, for example in relation to a horizontal plane, is to be maintained throughout the entire path of movement of the work equipment.

Advantageously, for each desired position the control device ascertains a desired angle between work equipment and arm, and does not release the next desired value of the sequence until the actual angle deviates by less than a predetermined value from the desired angle. In this manner, it is possible to ensure that no major errors are able to creep in during orientation of the work equipment either. On the contrary, small errors at the end of a section of the path of movement are immediately corrected.

Preferably, as a further position sensor there is connected to the control device an inclination sensor, which determines the inclination of the carrier in relation to the direction of the force of gravity. For example, this allows the work equipment to maintain a predetermined alignment in relation to a horizontal plane, so that loads arranged on the work equipment cannot slip off.

In a preferred form of construction, a selector arrangement for selecting a control mode is connected to the control device. The control device is therefore switchable. The work equipment can be moved in a conventional manner, the individual commands delivered from the operating device leading directly to an operation of the drive units. In that case, the work equipment is moved, as it were, in polar coordinates. A further control mode is the previously described automatic control of the work equipment along a straight line. Furthermore, the operator is able to choose whether he/she wishes to control the path of the work equipment in relation to the carrier or in relation to gravity. One can also choose whether the work equipment is to be held constant in relation to the vehicle or in relation to a horizontal plane, for example when the carrier is constructed as a vehicle and is moving around on site. All these functions can be realised with the path control arrangement described above.

It is also preferable for the control device to select a different control mode when an error occurs, which requires greater attention from the operator, and optionally for it to indicate this control mode. The control device is constantly checking for the appearance of errors in the path control arrangement. For example, all or some lines are permanently monitored for short-circuiting or interruption, that is to say, checks on whether the signal is, for example, less than 3% or more than 97% of the supplied value are carried out. A signal gradient can also be detected, that is to say, a change in a signal with time. When such a gradient is greater than it is physically possible for it to be, this suggests an error. Redundancies can also be built in. On the appearance of an error, the control device switches back to the next lower level of ease. Operation is able to continue, but demands greater attention from the operator.

In a preferred form of construction, a gear switch is connected to the control device. The gear switch is able to indicate whether the vehicle is moving or not. In a simple form, it is sufficient for the gear switch to indicate whether a gear has been engaged. In that case, movement of the vehicle must be supposed.

Advantageously, a measuring device is provided for the volumetric flow of the available hydraulic fluid. The measuring device detects the volumetric flow delivered from a pump. This is especially advantageous when the pump has to supply not only the drive units for moving the work equipment, but additionally has to have hydraulic fluid available for other purposes, for example for a hydraulic steering system or a brake system. The control device then constantly receives information about the amounts of hydraulic fluid with which it is able to operate.

It is then preferable for a device for determining the amount of hydraulic fluid required in dependence on the desired movement to be associated with each drive unit, the control device forming a quotient from the available and the required amount of hydraulic fluid and, should the quotient be smaller than unity, supplying each drive unit with an amount of hydraulic fluid reduced in accordance with the quotient. The amount of hydraulic fluid required for the drive units can be calculated from the position of the operating equipment, for example the angular position and deflection of an operating lever, and from a load acting upon the work equipment. By this means, as stated above, although the overall movement of the work equipment is possibly carried out at a reduced speed, the movement does, however, follow the required path. Without this balancing out of the needs of the individual drive units, the work equipment may indeed reach the desired finishing point of the path of movement, but it may follow a meandering path between the starting and finishing points.

Preferably, a stress-measuring device is connected to the control device, which detects the stress caused by the work equipment. The stress-measuring device can carry out a weighing function, for example, so that the work done by the work equipment can be determined.

Advantageously, an alarm arrangement is provided, which triggers an alarm and/or prevents movements of the work equipment that increase a moment acting on the carrier when a value ascertained from the stress caused by the work equipment and the length and the rotation of the arm exceeds a predetermined limit. The alarm arrangement serves therefore to enhance the safety of the carrier against tipping and thus the safety of the operator. If the stress of the work equipment and the length of the arm are too great, the moment on the carrier may become too great and the carrier may tip over. Normally, in the case of the work equipment being considered here, only precautions against tipping forwards need be taken. In extreme cases, for example when the work equipment is being used on an all-terrain vehicle and the vehicle is being driven up a relatively steep slope, tipping backwards or to the side may occur.

Advantageously, the input control signals determine the direction and the speed of movement of the work equipment. If, for example, the operating device is in the form of a control lever, the direction of the deflection of the control lever may give the direction of movement of the work equipment and the degree of deflection may give the speed of movement of the work equipment. In this manner, it is not the final position of the work equipment that is determined but only the path of movement. The control device then calculates successively the sections of the path of movement, as long as the input control signals delivered from the operating device indicate that a movement of the work equipment is desired.

It is then preferable for the input control signals to be in the form of values in a Cartesian coordinate system, the control device converting these values into polar coordinates. The input control signals are better adapted to human powers of imagining the movement of the work equipment. A person is generally better able to imagine a rectilinear movement that is composed of individual movements proportional to one another than a rectilinear movement in a polar co-ordinate system, which generally requires a relatively complicated conversion with trigonometric functions.

Preferably a gate circuit is provided at the output of the control device which frees a signal path to the output in dependence on the actual position and the current desired position of the work equipment. The gate circuit is therefore the block at the output of the control device, with the assistance of which the individual sections of the path of movement are initiated.

It is preferable here for the values of the actual position to be supplied to the gate circuit by way of a transformation circuit for conversion from polar into Cartesian co-ordinates. The gate circuit can then compare directly whether the desired position has been reached or not.

Advantageously a switch is provided which connects the position sensors with the data memory as soon as the operating device is in its neutral position. The position sensors in this case give the actual position as the starting position for the next movement sequence.

Advantageously, a control loop is associated with each drive unit. The control loop adjusts the drive unit to the required desired position.

It is then preferable for each control loop to have a member with a variable amplification factor. The amplification of the individual control loop can then be adapted to requirements. For example, a control loop can be provided with a higher amplification factor in order to achieve a more rapid control, if this is necessary.

It is then preferable for the amplification factor of a control loop to be dependent on the control state of the other control loops. In this manner an "error synchronisation" can be achieved. Using this, the control signals emitted by the individual control loops cause the individual drive units to effect substantially such movements that the position of the work equipment follows the desired path of movement. Advantageously, the amplification factor is formed according to the following formula:

$$KRi = 1 + 3 \times \frac{ei}{1 + ej + ek},$$

where KR is the amplification factor, e is the relative error and i, j, k, are the indices for the individual control loops. The relative error is the control difference relative to the reference parameter. At the start of a movement, all relative errors equal unity, since the control difference is the same size as the reference parameter. In that case the amplification factor is KR=2. When all control loops have adjusted themselves, the relative error disappears, and KR=1. If two circuits j and k have now adjusted themselves before the control loop i is set in operation, for example because of the inertia of the drive unit, then KRi=4.

Preferably, each control loop has at least one auxiliary parameter impressed upon it. With the assistance of the auxiliary parameter, difficulties in the transformation of a valve characteristic of a drive element can be overcome. For example, the valve characteristics, that is to say, the correlation between the signal and the flow allowed through by the valve, are not always linear. The valve characteristic frequently also has jumps in it or is not everywhere differentiable.

It is then preferable for a first auxiliary parameter to correspond to a dead band of a valve characteristic. The dead band of the valve characteristic means that the valve does not open until the signal has reached a minimum level.

Preferably, provision is made for the control device to open the valves step-wise in succession from a neutral position first of all in one direction until the associated sensors register a movement of the particular drives, to move the valves into the neutral position, and then to open them step-wise in the other direction until the sensors again indicate a movement, and to determine the dead band from the sensor signals. A dead band for an operating lever and other parts can also be determined in this manner. The adjustment of the drives and of the valves can therefore be carried out with less precision. Nevertheless, a uniform continuous movement of the work equipment can be achieved through this self-calibration.

Advantageously, a second auxiliary parameter is ascertained from the slope of the valve characteristic. The slope of the valve characteristic represents the correlation between the input signal of the valve, for example an electrical signal, and the output signal, that is to say, the flow of hydraulic fluid allowed through.

Advantageously, the second auxiliary parameter is fed into the control loop as a feed-forward variable. A change in the reference parameter then continues to act relatively quickly upon the drive unit.

Preferably, the auxiliary parameters are entered in the data memory. When commissioning the system, the auxiliary parameters required for the individual valves are read in once. When performing calculations the control device can then always refer back to them.

The invention is described below with reference to a preferred example of an embodiment in conjunction with the drawing, of which:

Figure 2:
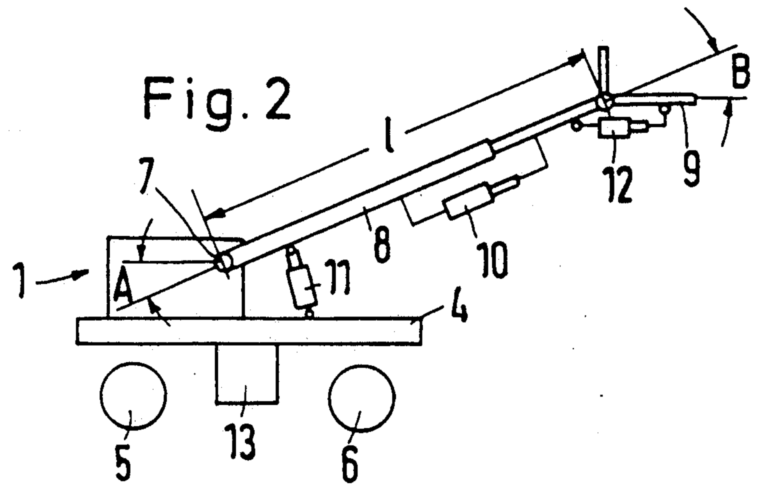
FIG. 2 shows a diagrammatic view of a carrier with work equipment.

The path control arrangement can be used, for example, in an all-terrain fork lift truck 1, an excavator 2 or a mobile crane 3 or other work equipment that is intended to be moved linearly. The invention is explained below with reference to a fork-lift truck. A fork-lift truck 1 of this kind is illustrated in FIG. 2. The fork-lift truck has a carrier 4, which can be driven on wheels 5, 6. On the carrier 4 there is arranged an arm 8 pivotable about an axis 7 fixed with respect to the carrier, at the other end of which the fork 9 is secured as the work equipment. The length of the arm 8 is adjustable using a drive unit for length 10, and is pivotable about the axis 7 using a drive unit for angle 11. The fork 9 can be inclined relative to the arm 8 using a work equipment drive unit 12. The length l of the arm, the angle A relative to the carrier 4 and the angle B of the fork 9 relative to the arm 8 can be adjusted by the drive units 10 to 12. The drives can be constructed, for example, as hydraulic piston-cylinder units that work in two directions. Each drive unit 10 to 12 has at the same time a position sensor, not illustrated in detail, which detects the position of the piston inside the cylinder. From this position, because of the known transmission ratios, a clear conclusion on the length l and the angles A and B can be drawn. With the assistance of the position sensors, it is possible to obtain clear information about the position and the orientation of the fork 9. On the carrier there is furthermore arranged an inclination sensor 13, which records the inclination of the carrier 4 relative to the direction of the force of gravity. When the inclination sensor is included in a control loop then not only can the position and the orientation of the fork 9 relative to the carrier be ascertained, but also the orientation and the position of the fork 9 relative to a horizontal plane.

An important movement performed by the fork 9 of the fork-lift truck 1 is to lift up pallets. To that end, the horizontal portion of the fork 9 has to be driven beneath the pallet. Because the pallet is not always arranged in rectilinear extension of the arm 8, this rectilinear movement requires not only an extension of the arm 8, but also a simultaneous swivelling of the arm 8 about the axis 7 with the aid of the drive unit for angle 11. In order to keep the horizontal portion of the fork 9 in the horizontal plane during this operation, the work equipment drive unit 12 has to be operated at the same time. A path control arrangement 15 is provided to co-ordinate this movement. The path control arrangement 15 has an operating lever 16 which is connected to a control device 17. Depending on its position, the operating lever 16 supplies input control signals in1, in2, in3 to the control device 17. For example, the input control signals in1 and in2 can be generated by an inclination of the operating lever 16 forwards and backwards and to the left and the right respectively, and the input control signal in3 can be generated by operation of a button 18.

The control device 17 comprises a processing device 19, for example a microprocessor, and a data memory 20, which is connected to the processing arrangement 19. The input control signals in1, in2 and in3 are supplied to the processing arrangement 19. The input control signals in1, in2 represent respectively the direction of movement and the speed of movement of the fork 9 as the work equipment in a Cartesian co-ordinate system. This corresponds best to human powers of imagination. Because of the length-adjustable and pivotable arm 8, the movement of the fork 9 is best described, however, in a system of polar co-ordinates. The drive unit for length 10 then represents the movement of the fork 9 in the radial direction and the drive unit for angle 11 represents the movement of the fork 9 in the azimuthal direction. Conversion of the Cartesian co-ordinates into polar coordinates is effected with the aid of the processing arrangement 19.

At its output, the processing arrangement 19 produces signals s1, s2, s3, that is, desired values for the drive unit 10 for length, the drive unit 11 for angle and the work equipment drive unit 12. The desired values are supplied as reference parameters to controllers R1, R2 and R3 respectively. Each controller R1, R2, R3 is connected to a valve V1, V2, V3. The individual valves are connected to the drives 10 to 12, which for the sake of simplicity are indicated as M1, M2 and M3. The controllers R produce at their output an electrical control signal which is supplied to the valves V. The valves V convert the electrical signal into a hydraulic signal, that is to say, they admit an amount of hydraulic fluid that varies in dependence on their input signals to the drives M. At the output of the drives M, or more accurately, at the output of the position sensors associated with the drives M, information about the positional change effected by the drives M can be obtained. This is fed back to the controllers R and the processing arrangement 19 through signals f1, f2 and f3. The valves V1, V2 and V3 report any error to the processing arrangement 19 through signals a1, a2 and a3.

In addition, a signal t1, which corresponds to the amount of hydraulic fluid made available from the hydraulic fluid supply, a signal t2, which corresponds to the output of the inclination sensor 13, and a signal t3, which corresponds to a load signal are supplied to the processing arrangement 19. Furthermore, the processing arrangement 19 receives a signal t4 from a gear switch 21. The processing arrangement 19 is also connected to a mode-selector arrangement 22, with which it exchanges signals i1, i2, i3, i4, i5 and i6.

An input device 23 is also provided, with the aid of which values can be entered into the data memory 20 or the processing arrangement 19.

Figure 3:
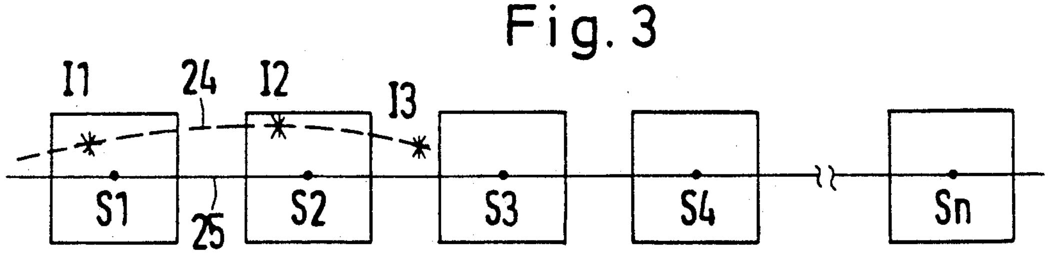
FIG. 3 shows a diagrammatic view of a rectilinear path of movement.

The control device 17, however, not only has the task of converting the Cartesian input control signals into polar signals for control of the drive units 10 to 12; it also monitors whether the work equipment 9 has performed the required linear movement. For that purpose, the control device 17 calculates a sequence of desired values (FIG. 3) S1, S2, S3, S4 . . . Sn, which lie on the desired linear or rectilinear path of movement of the work equipment 9. The control device 17 then controls the drive unit 10 for length and the drive unit 11 for angle so that the actual path of movement 24 of the work equipment 9 runs as closely as possible to the desired path of movement 25. For that purpose the work equipment 9 is moved, as it were, in stages, that is to say, it moves from one desired position to the other. In this operation, the next desired value S is not released until the actual position I of the work equipment 9 is within a predetermined range about the desired value S. This will be explained with reference to FIG. 3. During the movement along the path of movement the control device 17 has selected the desired value S1. The work equipment 9 has reached the position I1. The control device 17 has then calculated the desired value S2. The work equipment 9 has been moved along the path 24 to the position I2. The control device 17 has then released the next desired value S3. The work equipment 9 has now reached the position I3. The next desired value S4 cannot be released yet because the position I3 is still outside a tolerance band around the desired value S3. The tolerance bands are shown exaggeratedly large in comparison with the length of the path sections. The desired values S are arranged so closely together that the work equipment is able to cover the distance between two adjacent desired positions in fractions of a second, for example ten milliseconds. Ten milliseconds after making available a desired value S1, the control device 17 already has the next desired value S2 available. Whether this desired value is released or not depends entirely on whether the actual position Il of the work equipment 9 lies within the tolerance band about the desired value S1 or not. The error and/or the deviation between the desired path of movement 25 and the actual path of movement 24 thus move within the magnitude of the tolerance band around the desired values S. Because the coincidence between the actual path of movement 24 and the desired path of movement 25 is checked about 100 times per second, no major errors are able to occur. The drive unit 10 for length and the drive unit 11 for angle are driven by their respective controllers R1 and R2 so that they reach, at least theoretically, the desired value S. It is irrelevant whether both drive units reach their position associated with the desired value simultaneously or one after the other. The control device 17 at any rate waits until both drive units has moved the work equipment 9 into the error or tolerance band around the desired value S. All drive units are controlled, however, so that a uniform, continuous movement occurs, and the work equipment does not jerk. If it is possible for the work equipment, for example the fork 9, to be orientated also in relation to the arm 8, the control device also waits until the desired angle corresponding to a suitable desired value has been reached, that is to say, the deviation of the actual angle B from the desired angle B is less than a predetermined limit of error.

Figure 4:
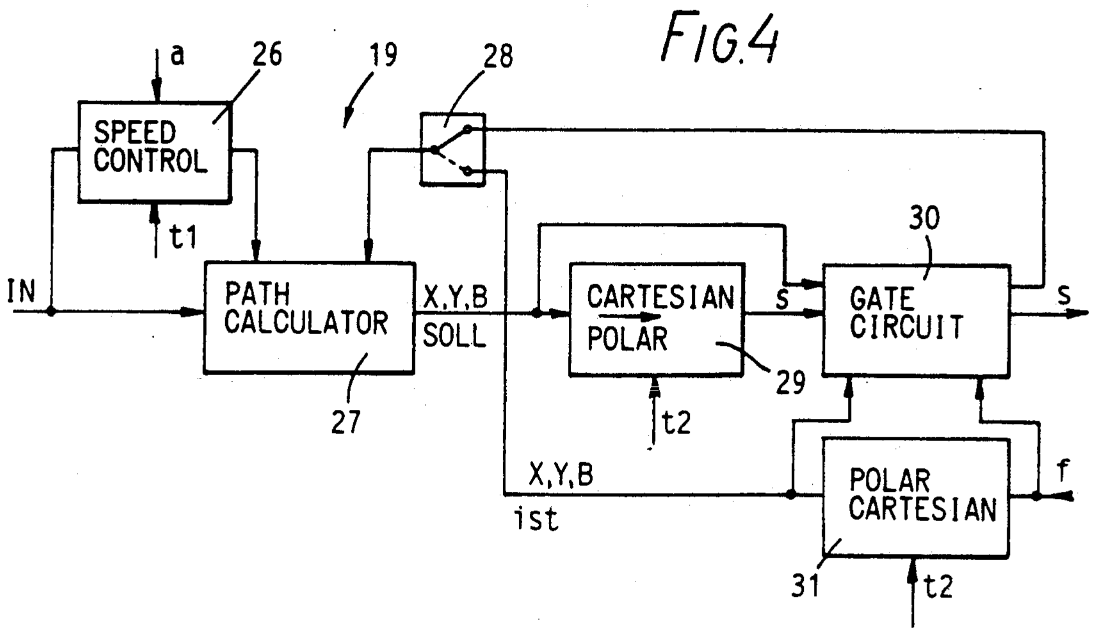
FIG. 4 shows a diagrammatic view of the internal construction of the control device.

The construction of the processing arrangement 19 will now be explained in detail with reference to FIG. 4. Only a single signal flow for all input control signals in1, in2, in3 is illustrated, since these are processed jointly.

Through the input control signals in from the operating lever, the processing arrangement 19 receives the direction and the speed with which the work equipment 9 is to be moved. The input control signals in and the load signal are also a measure of the amount of hydraulic fluid that is required. The amount of hydraulic fluid is calculated from them. It is represented by the signal a. The input control signals in are supplied to a speed-controlling device 26, to which also the signal t1, which represents the maximum amount of hydraulic fluid available, are supplied. The speed-controlling device 26 forms the quotient from t1 and a. When the quotient is less than unity, this means that the source of hydraulic fluid is not able to make the required amount of hydraulic fluid available. That means, for example, that the speed at which the operator wishes to move the work equipment cannot be achieved. The output of the speed-controlling device 26 is supplied to a path-calculating device 27 which also has the input control signals supplied to it. In dependence on the input control signals in, the path-calculating device 27 calculates a sequence of desired values S and thus a sequence of sections of the path of movement 25. The starting values for each section are supplied by way of a switch 28. During the movement of the work equipment the switch 28 is in the operating position illustrated by a solid line. When the work equipment is not being moved, it is in the operating position illustrated by a broken line. At its output the path-calculating device 27 produces the co-ordinates X, Y of the next desired position S and the accompanying angle B for the orientation of the work equipment 9 in relation to the arm 8. The distance between two pairs of co-ordinates is determined by the desired speed, or, if this cannot be a reached, by the maximum speed. The co-ordinates X, Y are in the form of Cartesian co-ordinates which are converted in a transformation device 29 into polar co-ordinates s. The signal t2 produced by the inclination sensor 13 is also included in the conversion or transformation. The signals s are supplied to a gate circuit 30, from the output of which they are supplied to the controllers R1, R2, R3. A further output of the gate circuit is returned to the switch 28. The gate circuit 30 is controlled by signals f which are produced by the position sensors. The signal f thus represents the actual position of the work equipment 9. In this operation, the signals f can be supplied to the gate circuit 30 either directly or after an inverse transformation, which is carried out by an inverse transformation device 31. The gate circuit 30 compares the signals f with the signals s. If the signals s at the output of the gate circuit 30 coincide with the signals f, the gate circuit 30 opens, in order to allow the next desired value to pass to the controllers R1, R2, R3. Alternatively, the values X, Y, B (actual) at the output of the inverse transformation device 31 can be compared with the values X, Y, B (desired) from the output of the path-calculating device 27. When these values correspond, the gate circuit opens in order to allow the next desired value to pass to the controllers R1, R2, R3. The current desired value is returned to the path-calculating device 27 by way of the switch 28, so that the path-calculating device 27 has a basis for calculating the co-ordinates of the next desired value. When the movement of the work equipment 9 is ended, the switch 28 is returned to the switch position illustrated by a broken line. The current position of the work equipment 9 is now used as the actual position for the starting point of the calculation of the next sequence of movement path sections.

Figure 5:
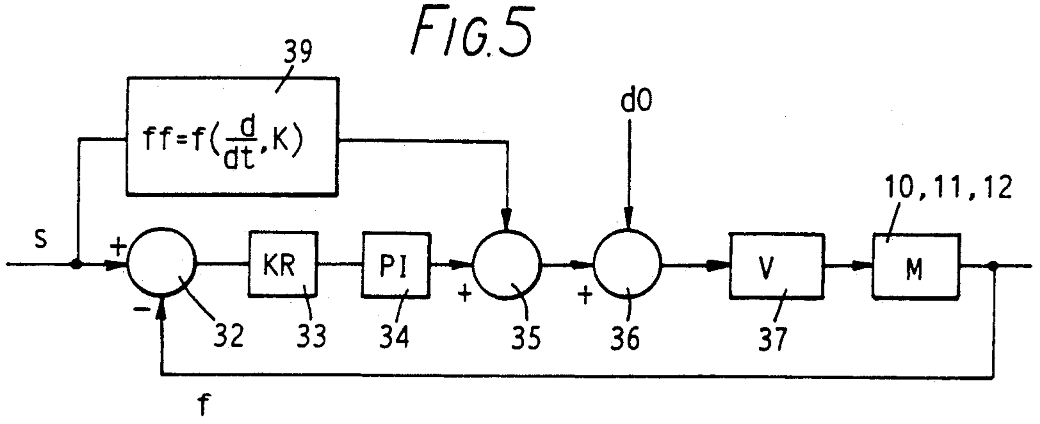
FIG. 5 shows a diagrammatic view of a controller.

FIG. 5 shows the diagrammatic construction of a control loop. Because the three control loops are, in principle, of the same construction, only a single control loop is described. The variable S obtained from the output of the gate circuit 30 is supplied as a reference parameter to the input of the control loop. The reference parameter is supplied by way of a summation point 32. The output of the summation point is connected to the input of an amplification device 33 with an amplification factor KR. The amplification factor KR is explained in further detail below. The output of the amplification member 33 is connected to the input of a PI-device 34. The output of the PI-device is connected to the input of a summation point 36. The output of the summation point 36 is connected to the input of a valve 37. The valve 37 converts the previously electrical signals into a fluid signal, which is supplied from the output of the valve 37 to the input of the drive unit 10, 11, 12. From the output of drive units 10, 11, 12, that is to say, from the associated position sensor, a signal is produced and fed back negatively to the summation point 32.

Before reaching the summation point 32, the signal s is removed and processed in a feed-forward arrangement 39. The feed-forward arrangement 39 takes into account the valve characteristic of the valve 37, that is to say, from the change in the signal s and the slope of the valve characteristic 1/K it forms a value that is added at the summation point 35 to the output of the PI-device 34. The valve characteristic has a certain dead band d0, that is to say, the valve does not produce a predetermined flow-through until the signal from the output of the summation point 36 exceeds a predetermined value. This dead band signal d0 is therefore added at the summation point 36 to the output of the summation point 35. The values d0 for the dead band and K for the slope of the valve characteristic can be stored in the memory 20. Errors that may occur as a result of the valve characteristic are largely compensated by the control system illustrated in FIG. 5.

The individual movements of the drive units 10, 11, 12 are, in principle, co-ordinated by the processing arrangement 19, which delivers only associated desired value points to the controllers R1, R2, R3. Provided that the individual control loops are operating approximately ideally, no further synchronisation or co-ordination of these control loops is required. In practice, however, it has been found that not all control loops operate at the same speed, for example because of different mass inertia, leakages, different deteriorations or fits. In that case, it is an advantage if the individual control loops communicate with one another and influence one another mutually, so that one can proceed on the assumption that all controls are concluded at roughly the same time. To that end, the amplification factor KR of the amplification member 33 of each control loop is designed to be variable. It is calculated according to the following formula:

$$KRi = 1 + 3 \times \frac{ei}{1 + ej + ek}.$$

Here, KR is the amplification factor, e is the relative error of the control loop, that is, the output value of the summation point 32 divided by its input value s, and i, j, k, are the indices of the individual control loops.

Figure 7:
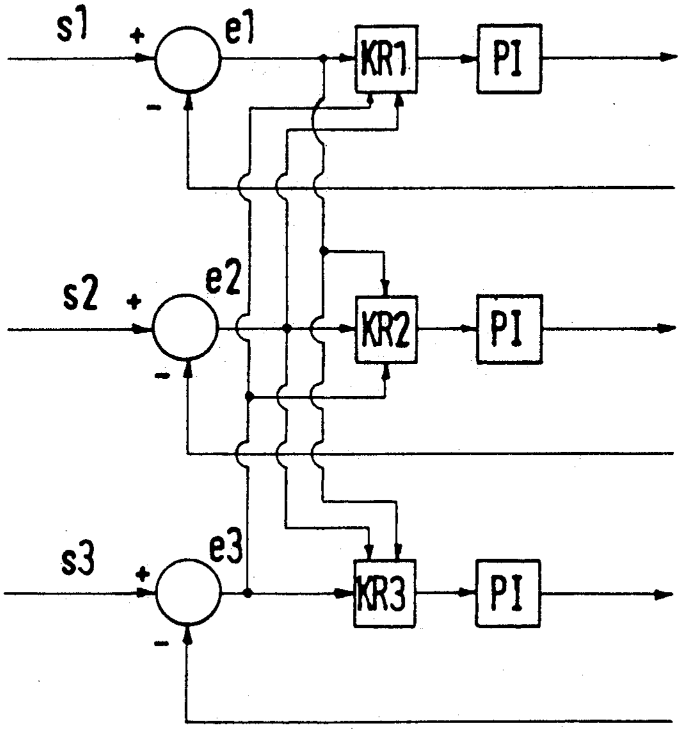
FIG. 6 shows a valve characteristic and FIG. 7 shows the interconnection of several controllers.

At the start of a movement, all relative errors e equal one, so that KR=2. When all control loops have adjusted themselves, KR=1 is obtained. When, for example, two control loops have adjusted themselves, that is to say, their control deviation equals zero, before the remaining loop has started the control, KR=4. The control of that circuit will therefore start with a large amplification factor, so that the error becomes smaller relatively quickly. When the error becomes smaller, the amplification factor of that circuit also becomes smaller, so that it then rapidly approaches the value unity. In that case, stable conditions are reached very quickly. A corresponding interconnection of the individual controllers is illustrated in FIG. 7.

Figure 1:
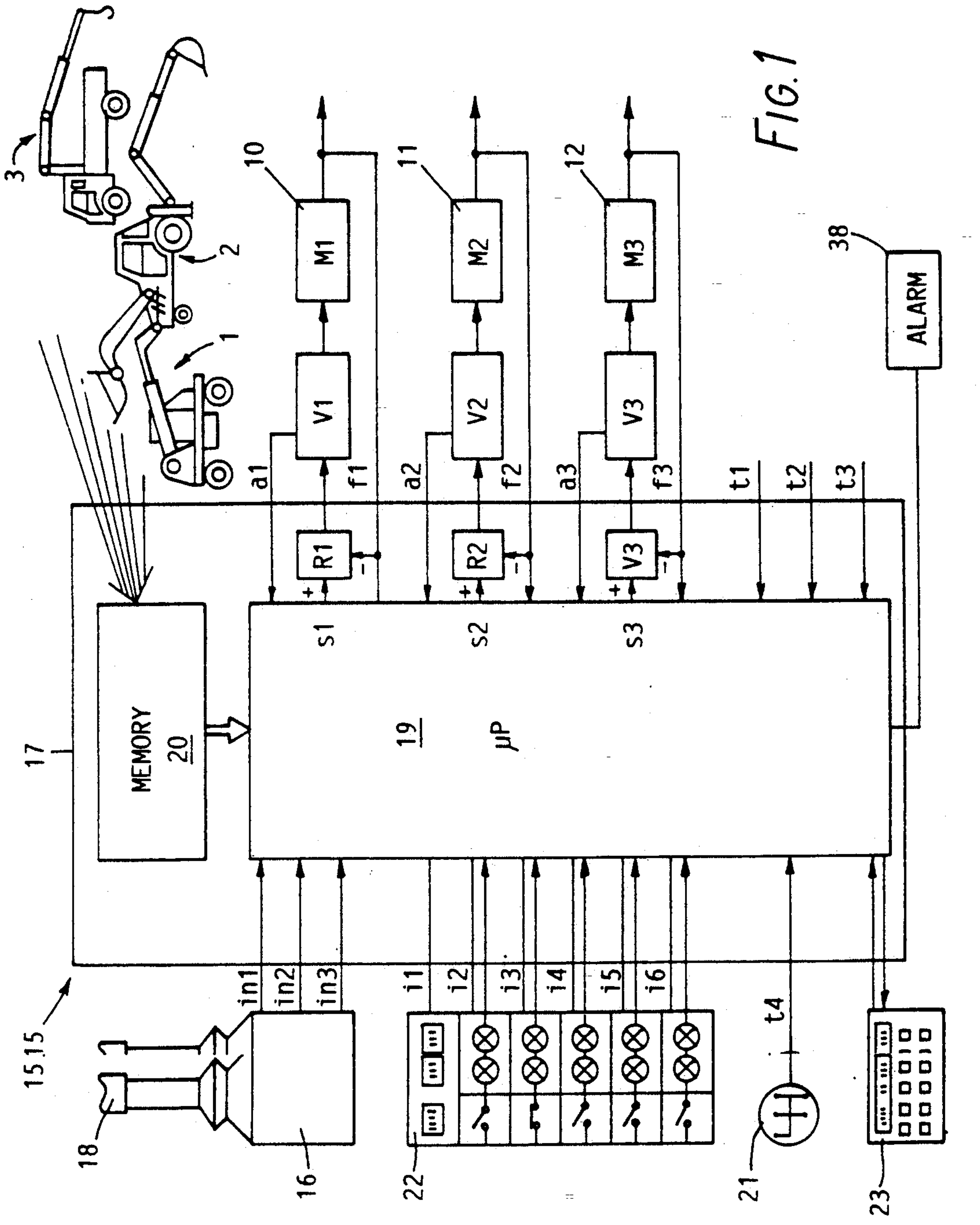
FIG. 1 shows a diagrammatic view of a path-control arrangement.
Figure 6:
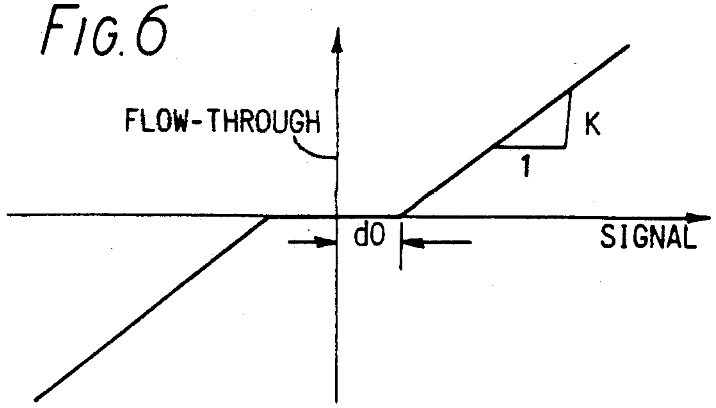

Using the input device 23 (FIG. 1), it is possible, for example, to enter the values of the valve characteristic (FIG. 6) into the memory 20.

Using the mode-selector arrangement 22, different modes of operation may be selected. For example, a conventional control of the work equipment 9 can be carried out. With the three signals from the operating lever 16, the drive unit 10 for length, the drive unit 11 for angle and the work equipment drive unit 12 can be controlled independently of one another. It is then the job of the operator to combine these three movements into one operation, that is to say, into a suitable movement of the work equipment 9. For example, the forward-and-backward movement of the lever can control the drive unit 10 for length, while the left-to-right movement of the operating lever 16 can control the drive unit 11 for angle. The work equipment drive 12 can be controlled using the button 18 of the lever.

In another mode of operation the path of the work equipment 9 can be controlled in relation to the carrier 4. Here, the processing arrangement 19 controls the movements of the individual drive units 10–12 so that a direct correlation between the direction set by the operator at the operating lever 16 and the movement of the work equipment 9 is produced in a Cartesian co-ordinate system, which is fixed in relation to the carrier 4.

For example, the work equipment 9 is able to move in the direction of the Y-axis, that is to say, vertically, when the lever is moved forwards or backwards. The speed then corresponds to the deflection of the operating lever 16. If the lever is moved to the left or to the right, the work equipment moves in the direction of the X-axis of the co-ordinate system. In a combined movement of the operating lever 16, that is to say, when it is pressed to the left and forwards, the work equipment moves in a corresponding oblique yet rectilinear path in the Cartesian co-ordinate system.

Instead of the movement in relation to the carrier 4, the direction of the force of gravity or the horizontal plane can be selected as the reference parameter. This mode of operation can also be adjusted by the mode-selector arrangement 22. As a further mode of operation, the orientation of the work equipment 9 in relation to the carrier 4 can be kept constant. Orientation means the angle B. For example, the fork of a fork-lift truck should always be at the same angle to the carrier 4, even when the arm 8 is being raised.

In another possibility, the orientation of the work equipment 9 can be kept constant in relation to a horizontal plane, even when the carrier is in the form of a vehicle moving across sloping ground.

As mentioned above, the processing arrangement 19 is able to detect the weight of the work equipment 9 continuously. This can be effected, for example, in that, with a known initial weight of the work equipment 9, any change in weight of the work equipment 9 is registered.

Moreover, the processing arrangement 19 is continuously supplied with the length l of the arm 8 and the angle A, so that the processing arrangement 19 is able continuously to calculate the moment exerted by the work equipment 9 on the carrier 4. If the moment exceeds a critical value, an alarm can be triggered by means of an alarm arrangement 38, in order to alert the operator. At the same time, all movements of the work equipment 9 increasing the moment on the carrier 4 are stopped.

We claim:

1. A path control arrangement for hydraulically movable work equipment that is arranged at one end of a length-adjustable arm that is pivotable about an axis fixed with respect to the carrier, with hydraulic drive elements, comprising a drive unit for length for changing the length of the arm and a drive unit for angle for pivoting the arm, a control device which comprises a data memory and a processing arrangement, an operating device which is connected to the control device and generates input control signals depending on its position, position sensors which ascertain the length of the arm and its angle in relation to a predetermined plane, said control device having means operable from an actual starting position for ascertaining a sequence of desired positions and delivering a drive signal to the hydraulic drive units in order to move the work equipment from its current position into the next desired position, said control device having means for preventing the release of the next desired position until said position sensors report that the work equipment is located within a predetermined spacing about the current desired position.

2. A path control arrangements according to claim 1, characterized in that approximately ten milliseconds after making available one desired value, the control device makes available the next desired value.

3. A path control arrangement according to claim 1, characterized in that between the work equipment and the arm there are provided a hydraulic work equipment drive unit connected to the control device, and an angle sensor connected to the control device for ascertaining the angle between the work equipment and the arm.

4. A path control arrangement according to claim 2, characterized by said control device having means for ascertaining for each desired position a desired angle between the work equipment and the arm and operates to hold the next desired value of the sequence until the actual angle deviates by less than a predetermined value from the desired angle.

5. A path control arrangement according to claim 1, characterized in that an inclination sensor is connected to the control device as a further position sensor which determines the inclination of the carrier in relation to the direction of the forces of gravity.

6. A path control arrangement according to claim 1, including means for ascertaining the amount of hydraulic fluid required in dependence on the desired movement is associated with each drive unit, means forming a quotient from the available and the required amount of hydraulic fluid, and means supplying each drive unit with an amount of hydraulic fluid reduced in accordance with the quotient if said quotient is less than unity.

7. A path control arrangement according to claim 1, characterized in that a gate circuit at the output of the control device frees a signal path to the output in dependence on the actual position and the current desired position of the work equipment.

8. A path control arrangement according to claim 1, characterized by a switch for connecting the position sensors with the data memory as soon as the operating means is in its neutral position.

9. A path control arrangement according to claim 1, characterized in that each drive unit has a control loop associated with it.

10. A path control arrangement according to claim 9, characterized in that each control loop includes a member having a variable amplification factor (KR).

11. A path control arrangement according to claim 10, characterized in that the amplification factor (KR) of a control loop depends on the control state of the other control loops.

12. A path control arrangement according to claim 11, characterized in that the amplification factor is set up according to the following formula $$KRi = 1 + 3 \times \frac{ei}{1 + ej + ek},$$

where KR is the amplification factor, e is the relative err or of the individual control loops and i, j, k are the indices for the individual control loops.

13. A path control arrangement according to claim 9, characterized in that each control loop has at least one auxiliary parameter impressed onto it.

14. A path control arrangement according to claim 13, characterized in that a first auxiliary parameter corresponds to a dead band (d0) of a value characteristic.

15. A path control arrangement according to claim 14, characterized in that the control device has means for firstly opening the valves step-wise in succession from a neutral position first of all in one direction until the associated sensors register a movement of their respective drives, secondly moving the valves into the neutral position, and thirdly opening the valves stepwise in the other direction until the sensors again indicate a movement and ascertains the dead band from the sensor signals.

16. A path control arrangement according to claim 15, characterized in that a second auxiliary parameter is ascertained from the slope of the valve characteristic.

17. A path control arrangement according to claim 16 characterized in that the second auxiliary parameter is fed into the control loop as a feed-forward variable.

* * * * *